(12) United States Patent
Sam

(10) Patent No.: US 9,424,457 B1
(45) Date of Patent: Aug. 23, 2016

(54) OPTICAL PRISM MODULE

(71) Applicant: IDspire Corporation Ltd., New Taipei (TW)

(72) Inventor: Ri Mun Sam, New Taipei (TW)

(73) Assignee: IDSPIRE CORPORATION LTD., New Taipei (TW)

( * ) Notice: Subject to any disclaimer, the term of this patent is extended or adjusted under 35 U.S.C. 154(b) by 0 days.

(21) Appl. No.: 14/813,179

(22) Filed: Jul. 30, 2015

(51) Int. Cl.
  *G02B 5/08* (2006.01)
  *G06K 9/00* (2006.01)
  *G02B 5/04* (2006.01)

(52) U.S. Cl.
  CPC ............. *G06K 9/00046* (2013.01); *G02B 5/04* (2013.01)

(58) Field of Classification Search
  CPC .......... G06K 8/00046; G06K 9/00013; G06K 9/00892; G06K 9/2036; F41A 17/066; A61B 5/1172; G02B 5/04
  USPC ............. 359/833; 356/71; 382/124, 116, 126; 340/5.53
  See application file for complete search history.

(56) References Cited

U.S. PATENT DOCUMENTS

2006/0119837 A1\* 6/2006 Raguin ............. G06K 9/00046
  356/71

\* cited by examiner

*Primary Examiner* — Euncha Cherry
(74) *Attorney, Agent, or Firm* — Bacon & Thomas, PLLC

(57) ABSTRACT

The present invention relates to an optical prism module, comprising a collection surface arranged on the top of the optical prism module; a basal plane corresponding to the collection surface and situated on the bottom of the optical prism module; a mirror surface arranged on one end of the optical prism module, a first included angle being provided between the mirror surface and the collection surface, and a second included angle being provided between the mirror surface and the basal plane; and an output surface arranged on another end of the optical prism module, a third included angle being provided between the output surface and the collection surface, and a fourth included angle being provided between the output surface and the basal plane. Thereby, an operator is allowed to place fingerprint onto the collection surface for light source to be input from the basal plane and irradiated onto the fingerprint, and for light to undergo a first reflection and a second reflection with the basal plane and the mirror surface, respectively, after that, the output surface acts as a background surface for light output in the second reflection of the light, such that an external image sensor receives the light and forms a fingerprint image, in order to maintaining an optical path distance effectively and reducing the volume of the optical prism module.

5 Claims, 3 Drawing Sheets

OPTICAL PRISM MODULE

BACKGROUND OF THE INVENTION

1. Field of the Invention

The invention is an optical prism module, particularly related to a fingerprint recognition equipment, for light transmission.

2. Descriptions of the Related Art

Typically, a conventional optical fingerprint image acquisition device may be composed of a prism, a convex lens, an image sensor and a light source generally, in which the prism is arranged as an inverted triangle, the convex lens corresponds to a first side of the prism, the image sensor is in correspondence with the convex lens, and the light source corresponds to a second side of the prism.

In use, an operator is allowed to place fingerprint on a third side of the prism while the light source performs irradiation from the second side of the prism and a light ray is reflected to the first side of the prism by a fingerprint image, and in turn, the light enters the convex lens, followed by focusing on the image sensor to, thereby, perform fingerprint recognition.

However, for the above conventional optical fingerprint image acquisition device, the volume of the prism thereof is usually constrained to shape and cannot be reduced, such that it cannot be employed on current compact electronic devices effectively.

In order to overcome the disadvantages of traditional optical fingerprint image acquisition devices, related patents are proposed, such as P.R.C. invention patent publication No. CN101034437A, "Fingerprint Collecting Method and High-Resolution Thin Type Fingerprint Collector", which figures out existing issues of current technologies, including small acquisition and poor definition in existing technology. For its method, the light source is irradiated to the prism bottom through the prism, the fingerprint under the prism bottom reflects to reflection the prism oblique of the lumbar reflection mirror and black-paint film on the prism bottom, the fingerprint images on reflective mirror and black paint film project on the photoelectric detector through the back of prism and the projection lens. Collector is composed of the light source, a right angle trapezoidal prism which bottom longitudinal cross section greater than hight, lens and photo-electric detector; lens and photo-electric detector configurating in the backside of prism, the ramp lumbar of prism having a reflector surface, a viewfinder with oblique configuration on the lateral of lens, the photoelectric detector above viewfinder, the characteristic is that the bottom of the prism is painted black, black paint layer and reflector mirror as a reflector surface. The method has the advantages of a larger fingerprint reflector, a greater acquisition area and high definition. Collector of small size, light weight, large area of collected fingerprint image, high clarity, collector and prism to achieve ultra-thin, is convenient to match with mouse, keyboard, door locks, cars, mobile phones and other equipments of space-constrained installation for use.

Additionally, P.R.C. invention patent publication No. CN CN102004912 B, "Fingerprint Acquisition Device", comprises a light source, a prism, a light detector and an image sensor. The prism has a fingerprint acquisition surface, a reflection surface and an outgoing surface. The light detector is provided with a lens, and reflectors which are respectively arranged between the outgoing surface and the lens and between the lens and the image sensor. Light emitted by the light source is incident upon the prism, and light emitted by the outgoing surface is detected in the observation angle range and transmitted to the image sensor. The reflection surface is not symmetric relative to the observation shaft of the light detector, such that the light exits from one angle of the prism, and the path of light is refracted back to spare space at one side of the prism through the reflection of the reflectors. Thus, it has the advantage of reducing volume, and fitting product miniaturization tendency.

The light enters the prism, followed by outputting to the photoelectric detector with reflection for reducing a single optical path to reducing the volume of the fingerprint collection device in the patents mentioned above. By such an approach may improve shortages of traditional optical fingerprint image acquisition devices. However, those prisms with one reflection optical path still cannot satisfy current electronic products that are miniaturized (thinned) increasingly. Therefore, such various conventional products are still insufficient in real applications.

In view of this, the inventor of the present invention has researched and developed an optical prism module with efforts in order to improve various shortages of above conventional technologies.

SUMMARY OF THE INVENTION

A main objective of the invention is to allow an user to place his fingerprint onto a collection surface for a light source to be input from a basal plane and irradiated onto the fingerprint, and for light ray to undergo a first reflection and a second reflection with the basal plane and a mirror surface, respectively, after that, the output surface acts as a background surface for light ray output in the second reflection of the light ray, such that an external image sensor receives the light ray and forms a fingerprint image, in order to maintaining an optical path distance effectively and reducing the volume of the optical prism module.

To achieve above objective, the invention is an optical prism module, including: a collection surface arranged on the top of the optical prism module capable of being a fingerprint placement zone; a basal plane corresponding to the collection surface and arranged on the bottom of the optical prism module capable of being a light source input and performing a first reflection of the light ray; a mirror surface arranged on one end of the optical prism module, a first included angle being provided between the mirror surface and the collection surface, and a second included angle being provided between the mirror surface and the basal plane, capable of performing as a second reflection of the light ray in conjunction with the basal plane; and an output surface arranged on another end of the optical prism module, a third included angle being provided between the output surface and the collection surface, and a fourth included angle being provided between the output surface and the basal plane, capable of preforming as a background surface in the second reflection of the light ray and being for output of the light ray simultaneously.

In the preferred embodiment, the optical prism module is made of glass or plastic material.

In the preferred embodiment, an appropriate obtuse angle may be selected for the first included angle as need, and an appropriate acute angle may be selected for the third included angle as need.

In the preferred embodiment, an appropriate angle may be selected for the second included angle and the fourth included angle as need.

DETAILED DESCRIPTION OF THE PREFERRED EMBODIMENT

The invention is illustrated in detail as following by means of an embodiment below in connection with appended drawings for thorough understanding of objectives, features and effects of the invention.

Figure 1:
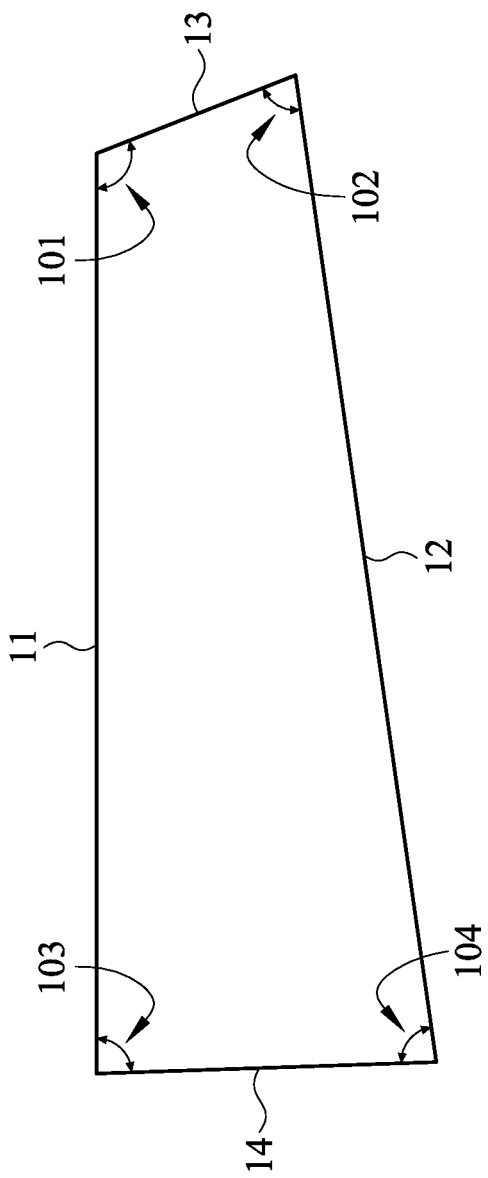
FIG. 1 is a schematic diagram showing a side view structure of the invention.
Figure 2:
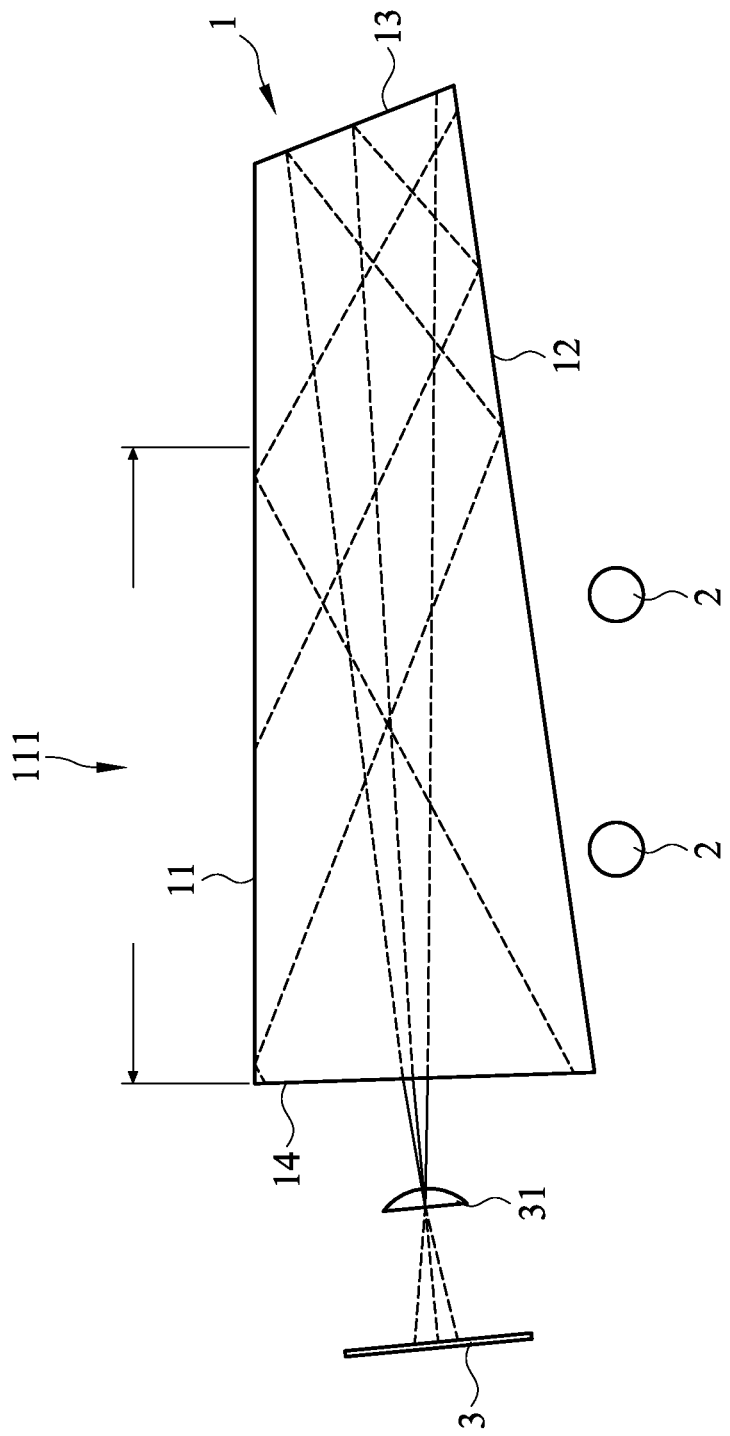
FIG. 2 is a schematic diagram showing an operating status of the invention.
Figure 3:
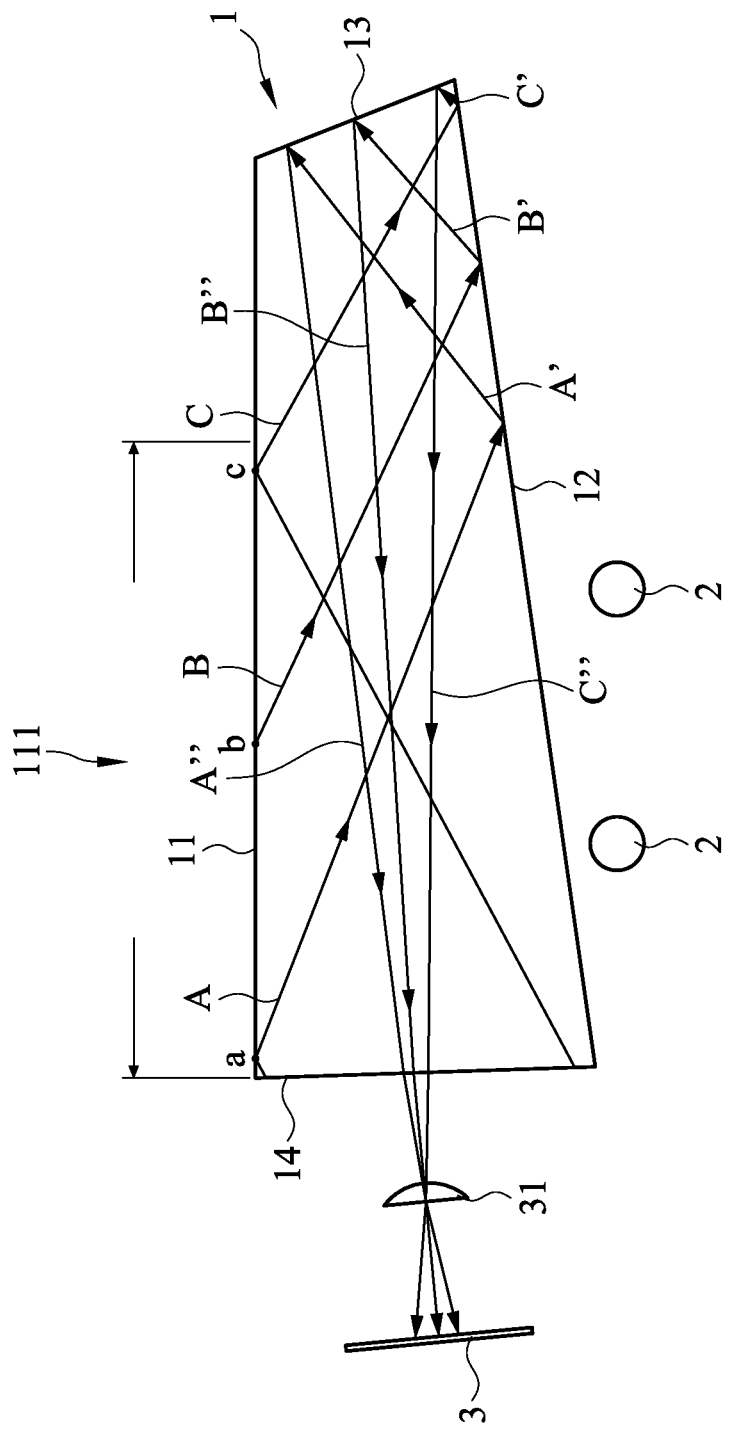
FIG. 3 is a schematic diagram showing an optical path in using the invention.

Refer to FIGS. 1, 2 and 3, which are a schematic diagram showing a side view structure of the invention, a schematic diagram showing an operating status of the invention, and a schematic diagram showing an optical path in using the invention. As shown in the figures, the present invention is an optical prism module 1 comprised at least of a collection surface 11, a basal plane 12, a mirror surface 13 and an output surface 14, and the optical prism module 1 is made of glass or plastic material.

The collection surface 11 is arranged on the top of the optical prism module 1 capable of being a fingerprint placement zone.

The basal plane 12 corresponds to the collection surface 11 and is situated on the bottom of the optical prism module 1 capable of performing as a light source input for a first reflection of a light ray.

The mirror surface 13 is arranged on one end of the optical prism module 1, and there is a first included angle 101 between the mirror surface 13 and the collection surface 11, and there is a second included angle 102 between the mirror surface 13 and the basal plane 12, the mirror surface 13 being capable of performing as a second reflection of the light ray in conjunction with the basal plane 12, wherein an appropriate obtuse angle may be selected for the first included angle 101 as need, and an appropriate angle may be selected for the second included angle 102 as need.

The output surface 14 is arranged on another end of the optical prism module 1, and there is a third included angle 103 between the output surface 14 and the collection surface 11, and there is a fourth included angle 104 between the output surface 14 and the basal plane 12, the output surface 14 being capable of acting as a background surface in the second reflection of the light ray and acting as light ray output simultaneously, wherein an appropriate acute angle may be selected for the third included angle 103 as need, and an appropriate angle may be selected for the fourth included angle 104.

Refer to FIGS. 2 and 3, in using of the optical prism module 1 of the present invention, a light source 2 and an image sensor 3 may be used in conjunction together, and the light source 2 may be arranged where the basal plane 12 is in correspondence while the image sensor 3 is arranged on one side of the output surface 14, and moreover, the optical prism module 1, the light source 2 and the image sensor 3 may be enclosed in a shell (not shown).

Furthermore, in operation, an user may be allowed to place his fingerprint onto a fingerprint placement zone 111 of the collection surface 11 for the light source 2 to be input from the basal plane 12 and irradiated onto the fingerprint, and for forming the light ray emitted by the light source 2 to become a left end incident ray A at a left endpoint a, a central incident ray B at a central point b and a right end incident ray C at a right endpoint c and projecting them onto the basal plane 12 by means of bumpy texture of the fingerprint, such that the left end incident ray A, the central incident ray B and the right end incident ray C undergo the first reflection on the basal plane 12, allowing the basal plane 12 to act as both light plane and reflecting surface, and further, for the left end incident ray A, the central incident ray B and the right end incident ray C to form a left end first reflected ray A', a central first reflected ray B' and a right end first reflected ray C' reflected on the mirror surface 13, respectively. After that, the left end first reflected ray A', the central first reflected ray B' and the right end first reflected ray C' undergo a second reflection using the mirror surface 13 as the reflecting surface for, in turn, the left end first reflected ray A', the central first reflected ray B' and the right end first reflected ray C' to form a left end second reflected ray A", a central second reflected ray B" and a right end second reflected ray C" reflected on the output surface 14, respectively, in order for, thereby, the left end second reflected ray A", the central second reflected ray B" and the right end second reflected ray C" to output simultaneously using the output surface 14 as the background surface such that consistency of the background surface and the imaging surface is achieved for the left end second reflected ray A", the central second reflected ray B" and the right end second reflected ray C" to be received by the image sensor 3 through the lens 31 to form a fingerprint image eventually. As such, the present invention can maintain optical path distance and reduce the volume of the optical prism module by at least two reflections effectively because more times of optical path refraction result in more miniaturized prism with respect to volume.

In summary of the description, the present invention achieves indeed the expected advantage of the invention according to the description disclosed above. An operator is allowed to place the fingerprint onto the collection surface for the light source to be input from the basal plane and irradiated onto the fingerprint, and for the light to undergo the first reflection and the second reflection with the basal plane and the mirror surface, respectively. After that, the output surface acts as the background surface and the light output in the second reflection of the light for the external image sensor to receive the light and form a fingerprint image to accomplish the effects of maintaining the optical path distance effectively and reducing the volume of the optical prism module.

It is noted that the description is only one preferred embodiment of the present invention and all variations of equivalent designs according to the claims of the present invention shall be within the technical scope of the present invention.

NUMERALS 1 optical prism module
11 collection surface
111 fingerprint placement zone
12 basal plane
13 mirror surface
14 output surface
101 first included angle
102 second included angle
103 third included angle
104 fourth included angle
2 light source
a left endpoint
A left end incident ray
b central point
B central incident ray
c right endpoint
C right end incident ray
A' left end first reflected ray
B' central first reflected ray C' right end first reflected ray
A" left end second reflected ray
B" central second reflected ray
C" right end second reflected ray
3 image sensor
31 lens

What is claimed is:

1. An optical prism module, including:
   a collection surface arranged on the top of the optical prism module capable of performing as a fingerprint placement zone;
   a basal plane corresponding to the collection surface and arranged on the bottom of the optical prism module capable of performing as a light source input for a first reflection of a light ray;
   a mirror surface arranged on one end of the optical prism module, a first included angle being provided between the mirror surface and the collection surface and a second included angle being provided between the mirror surface and the basal plane, capable of performing a second reflection of the light ray in conjunction with the basal plane; and
   an output surface arranged on another end of the optical prism module, a third included angle being provided between the output surface and the collection surface and a fourth included angle being provided between the output surface and the basal plane, capable of acting as a background surface when the light ray undergoes the second reflection and being used for output of the light ray.

2. The optical prism module as claim 1, wherein the optical prism module is made of glass or plastic material.

3. The optical prism module as claim 1, wherein an appropriate obtuse angle is selected for the first included angle as need.

4. The optical prism module as claim 1, wherein an appropriate acute angle is selected for the third included angle as need.

5. The optical prism module as claim 1, wherein an appropriate angle is selected for the second included angle and the fourth included angle as need.

* * * * *